US010270657B2

(12) United States Patent
Utoh

(10) Patent No.: US 10,270,657 B2
(45) Date of Patent: Apr. 23, 2019

(54) INFORMATION PROCESSING APPARATUS, METHOD FOR CONNECTING INFORMATION PROCESSING APPARATUS TO CLOUD SERVICE, AND RECORDING MEDIUM

(71) Applicant: Yohsuke Utoh, Kanagawa (JP)

(72) Inventor: Yohsuke Utoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 15/259,431

(22) Filed: Sep. 8, 2016

(65) Prior Publication Data
US 2017/0078149 A1 Mar. 16, 2017

(30) Foreign Application Priority Data

Sep. 14, 2015 (JP) .................................. 2015-180801
Aug. 2, 2016 (JP) .................................. 2016-151871

(51) Int. Cl.
*H04N 1/00* (2006.01)
*H04L 12/24* (2006.01)
*H04L 29/08* (2006.01)

(52) U.S. Cl.
CPC ...... *H04L 41/0883* (2013.01); *H04L 41/0672* (2013.01); *H04L 67/10* (2013.01);
(Continued)

(58) Field of Classification Search
CPC ..... H04L 41/0883; H04L 41/12; H04L 67/10; H04L 67/1006; H04L 67/1021;
(Continued)

(56) References Cited

U.S. PATENT DOCUMENTS

2011/0188063 A1* 8/2011 Nuggehalli ........ H04N 1/00233
358/1.13
2012/0140285 A1* 6/2012 Kamath ................ G06F 3/1204
358/1.15

(Continued)

FOREIGN PATENT DOCUMENTS

JP 2006-289690 10/2006
JP 2013-141170 7/2013

*Primary Examiner* — Sargon N Nano
(74) *Attorney, Agent, or Firm* — Harness, Dickey & Pierce, P.L.C.

(57) ABSTRACT

An information processing apparatus is configured to connect to a cloud server through a network, the cloud server including a plurality of servers providing a cloud service. The apparatus includes a memory to store connection destination information, and a plurality of network setting information lists, and circuitry to, in response to a user instruction for connecting the information processing apparatus to the cloud server, acquire the connection destination information, and the network setting information lists one by one in a descending order of probability, from the memory, to repeat operations of connecting the information processing apparatus to the cloud server using the acquired connection destination information and the acquired network setting information list until the connection is established with the cloud server, and notify a user of a progress status of the operations of connecting the information processing apparatus to the cloud server.

17 Claims, 16 Drawing Sheets

(52) U.S. Cl.
CPC ...... *H04L 67/1006* (2013.01); *H04L 67/1021* (2013.01); *H04L 67/1097* (2013.01); *H04L 67/141* (2013.01); *H04N 1/00344* (2013.01); *H04N 1/00411* (2013.01); *H04N 1/00477* (2013.01); *H04N 2201/0094* (2013.01)

(58) Field of Classification Search
CPC ... H04L 67/1097; H04L 67/141; H04L 63/10; H04L 67/16; H04N 1/00411; H04N 1/00477; H04N 2201/0094; H04N 1/00344; H04N 2201/0049; H04W 40/04; H04W 4/029

See application file for complete search history.

(56) References Cited

U.S. PATENT DOCUMENTS

| | | | |
|---|---|---|---|
| 2013/0179571 A1 | 7/2013 | Torii | |
| 2015/0070719 A1* | 3/2015 | Kuribara | G06F 3/1203 358/1.13 |
| 2015/0358491 A1* | 12/2015 | Watanabe | H04N 1/00904 358/1.13 |
| 2016/0011830 A1* | 1/2016 | Asakura | H04W 76/10 358/1.15 |
| 2016/0112585 A1* | 4/2016 | Park | G06F 3/1288 358/1.15 |
| 2016/0198510 A1* | 7/2016 | Perets | H04W 76/14 455/450 |
| 2016/0269935 A1* | 9/2016 | Yang | H04W 28/08 |
| 2017/0068492 A1* | 3/2017 | Nakamura | G06F 3/1212 |
| 2017/0220791 A1* | 8/2017 | Shibutani | G06F 21/35 |

\* cited by examiner

| LAYER | ITEMS TO BE SET | SETTING VALUE |
|---|---|---|
| APPLICATION LAYER | DHCP SERVICE | VALID |
| | DNS SERVICE | VALID |
| | PROXY SERVICE | INVALID |
| TRANSPORT LAYER | TCP | VALID |
| | UDP | VALID |
| NETWORK LAYER | IPv4 | VALID |
| | IPv6 | INVALID |
| LINK/PHYSICAL LAYER | CONNECTION PROTOCOL | PPP |
| | TUNNELING | INVALID |
| | PHYSICAL MEDIA | ETHERNET |

⋮ ⋮

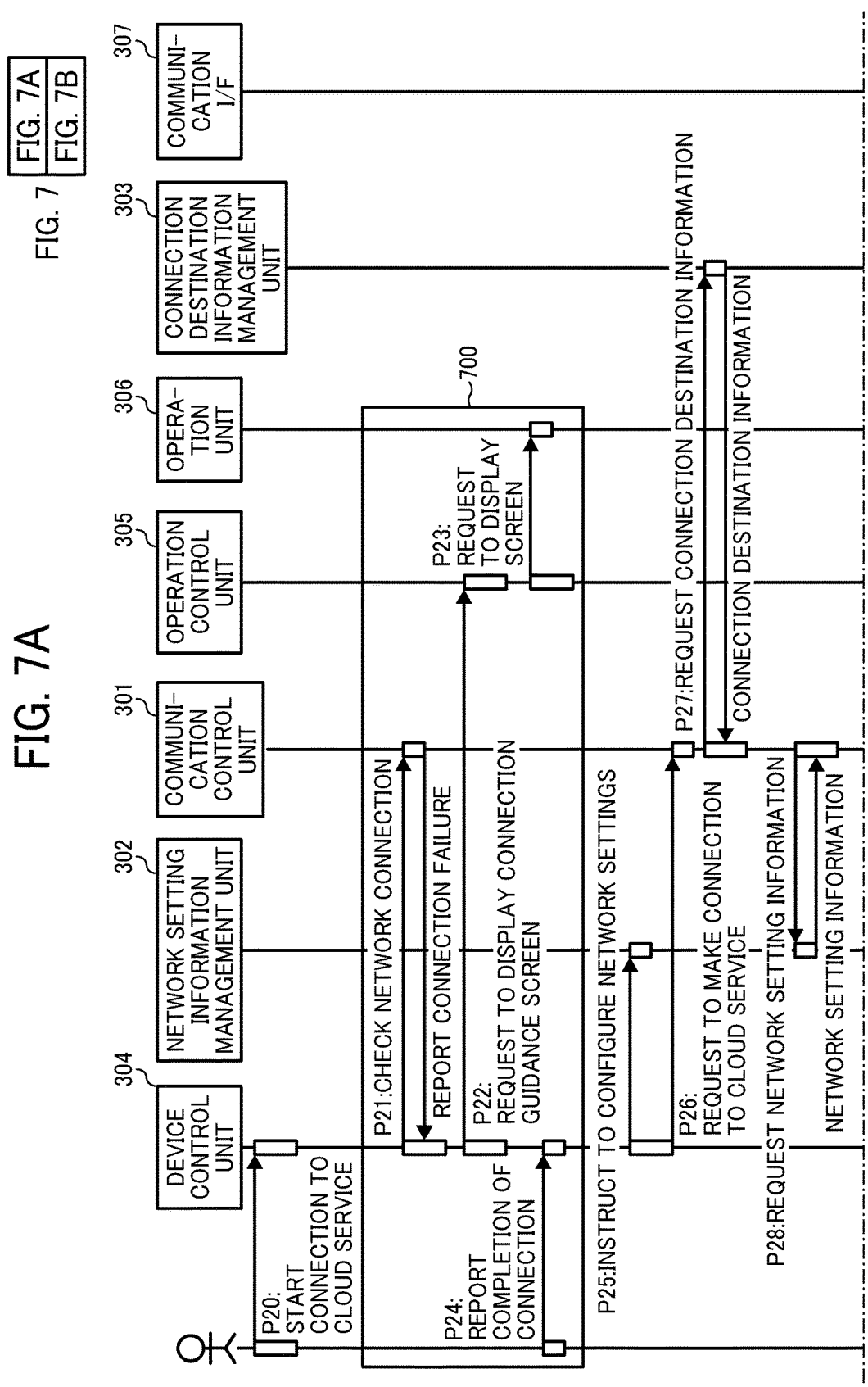

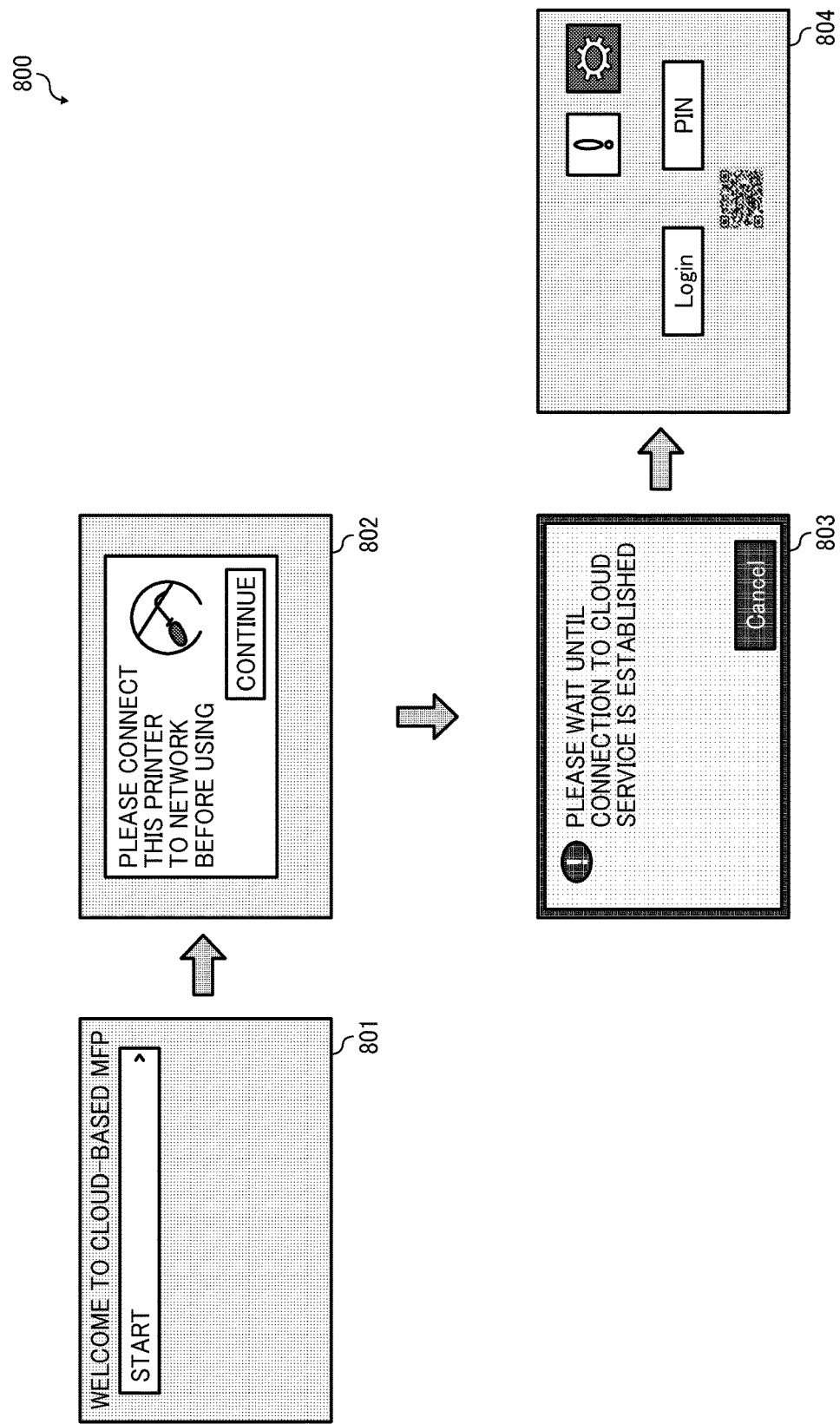

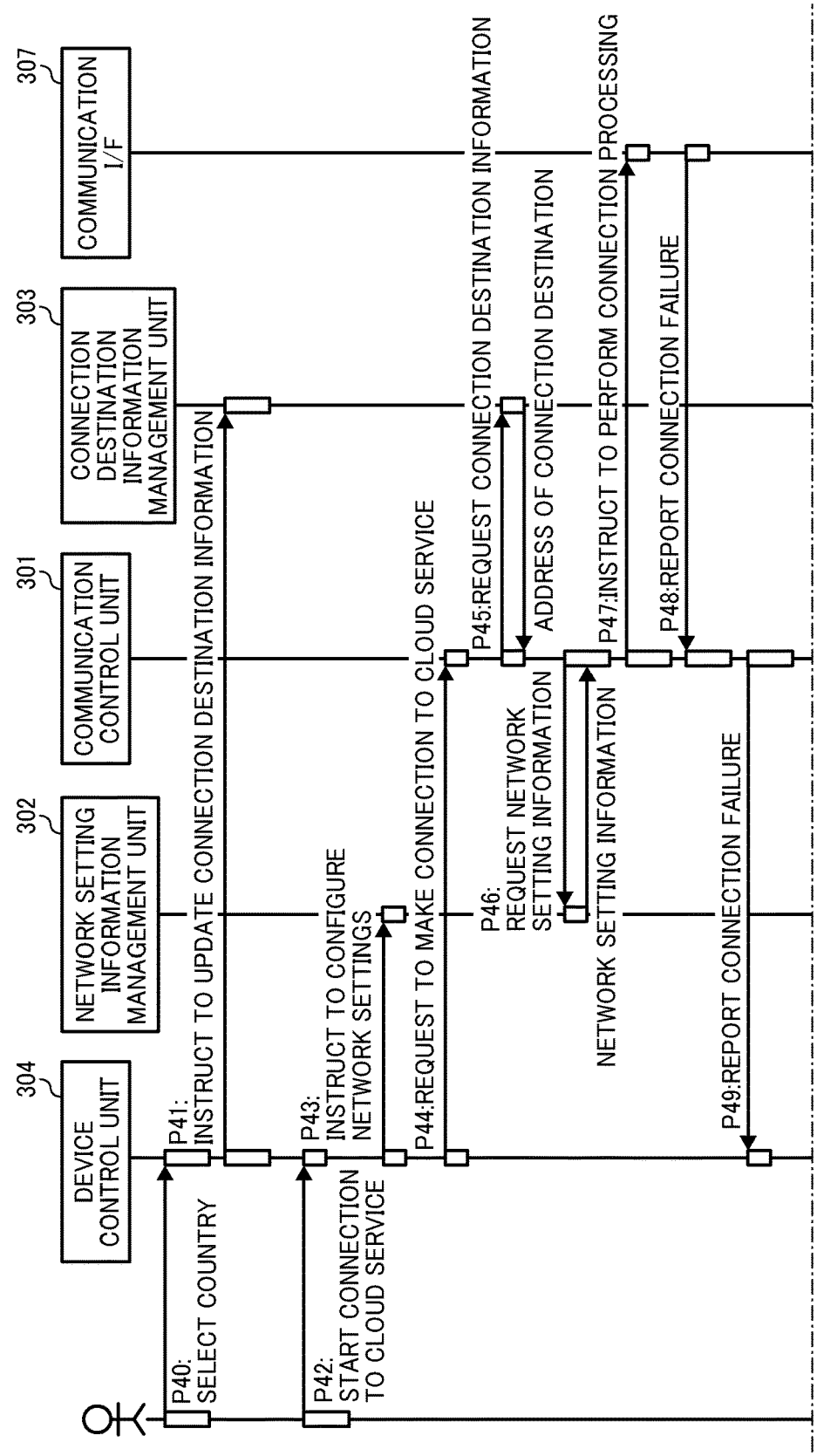

| COUNTRY INFORMATION | NETWORK ADDRESS |
|---|---|
| JAPAN | https://www.aaa.bbb.ccc.co.jp |
| UNITED STATES | https://www.ddd.eee.fff.co.us |
| UNITED KINGDOM | https://www.ggg.hhh.iii.co.gb |
| FRANCE | https://www.jjj.kkk.lll.co.fr |
| ⋮ | ⋮ |

| ITEMS TO BE SET | SETTING VALUE |
|---|---|
| VALID/INVALID OF DHCP | INVALID |
| PROTOCOL | IPv4 |
| IPv4 ADDRESS | 11.22.33.44 |
| IPv4 SUBNET MASK | 255.255.255.0 |
| IPv4 DEFAULT GATEWAY | 11.22.33.1 |
| VALID/INVALID OF PROXY | VALID |
| PROXY ADDRESS | 1.2.3.4 |
| PROXY PORT NUMBER | 8080 |
| WIRED/WIRELESS | WIRED |

INFORMATION PROCESSING APPARATUS, METHOD FOR CONNECTING INFORMATION PROCESSING APPARATUS TO CLOUD SERVICE, AND RECORDING MEDIUM

CROSS-REFERENCE TO RELATED APPLICATIONS

This patent application is based on and claims priority pursuant to 35 U.S.C. § 119(a) to Japanese Patent Application Nos. 2015-180801, filed on Sep. 14, 2015, and 2016-151871, filed on Aug. 2, 2016 in the Japan Patent Office, the entire disclosures of which are hereby incorporated by reference herein.

BACKGROUND

Technical Field

The present disclosure relates to an image processing apparatus, a method for connecting the information processing apparatus to a cloud service, and a non-transitory recording medium.

Description of the Related Art

Recent information processing apparatuses such as image forming apparatuses are capable of connecting to a network to acquire various information from external information processing apparatuses. With this configuration, the information processing apparatuses are able to perform high-value-added processing. For example, some image processing apparatuses use the functions of the external information processing apparatuses to improve their own functions such as image processing and execute scanning or printing based on a request read out from cloud servers via a network.

The connection to the network is implemented by a communication protocol such as the TCP/IP protocol and a data transfer protocol such as the HTTP protocol. In addition, the information processing apparatuses are required to access a server that provides a desired cloud service via a domain name system (DNS) service or a proxy server to connect to the network.

In order to access the cloud environment from the information processing apparatus such as a multiple functional peripheral (MFP) having a printer function, a scanner function, a facsimile function, a network connecting function, and a storage function, a user or a service person of a vendor has to configure initial setting after the installation of the MFP. However, the MFP often has user interfaces different from those of a typical information processing. In addition, a process for the initial setting varies depending on models of the MFP.

In view of such circumstance, it is not realistic to expect the user or the service person to acquire information or skills for accessing the cloud environment. It is preferable that the information processing apparatus makes a connection to the cloud environment without putting an excessive burden on the user or the service person.

SUMMARY

An information processing apparatus is configured to connect to a cloud server through a network, the cloud server including a plurality of servers providing a cloud service. The apparatus includes a memory and circuitry. The memory stores connection destination information indicating a connection destination of each one of the plurality of servers in the cloud server, and a plurality of network setting information lists each list being used for establishing a network connection with the cloud server. The circuitry is configured to, in response to a user instruction for connecting the information processing apparatus to the cloud server, acquire the connection destination information, and the network setting information lists one by one in a descending order of probability, from the memory, to repeat operations of connecting the information processing apparatus to the cloud server using the acquired connection destination information and the acquired network setting information list until the connection is established with the cloud server, and notify a user of a progress status of the operations of connecting the information processing apparatus to the cloud server.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an example of a list of network setting information according to an embodiment of the present invention;

FIGS. 7A and 7B are a sequence diagram illustrating an operation performed by the image processing apparatus when the image processing apparatus is not physically connected to a network according to an embodiment of the present invention;

FIG. 8 illustrates screens displayed by an operation unit of the image processing apparatus according to the operation illustrated in FIGS. 7A and 7B;

FIGS. 9A and 9B are a sequence diagram illustrating an operation of configuring the network settings according to another embodiment of the present invention;

FIG. 10 is an example of the connection destination information that is referred to in changing a country of connection destination according to an embodiment of the present invention;

FIG. 14 is an example of a list in which network setting items and setting values illustrated in FIG. 6 are specified in detail.

DETAILED DESCRIPTION

Figure 1:
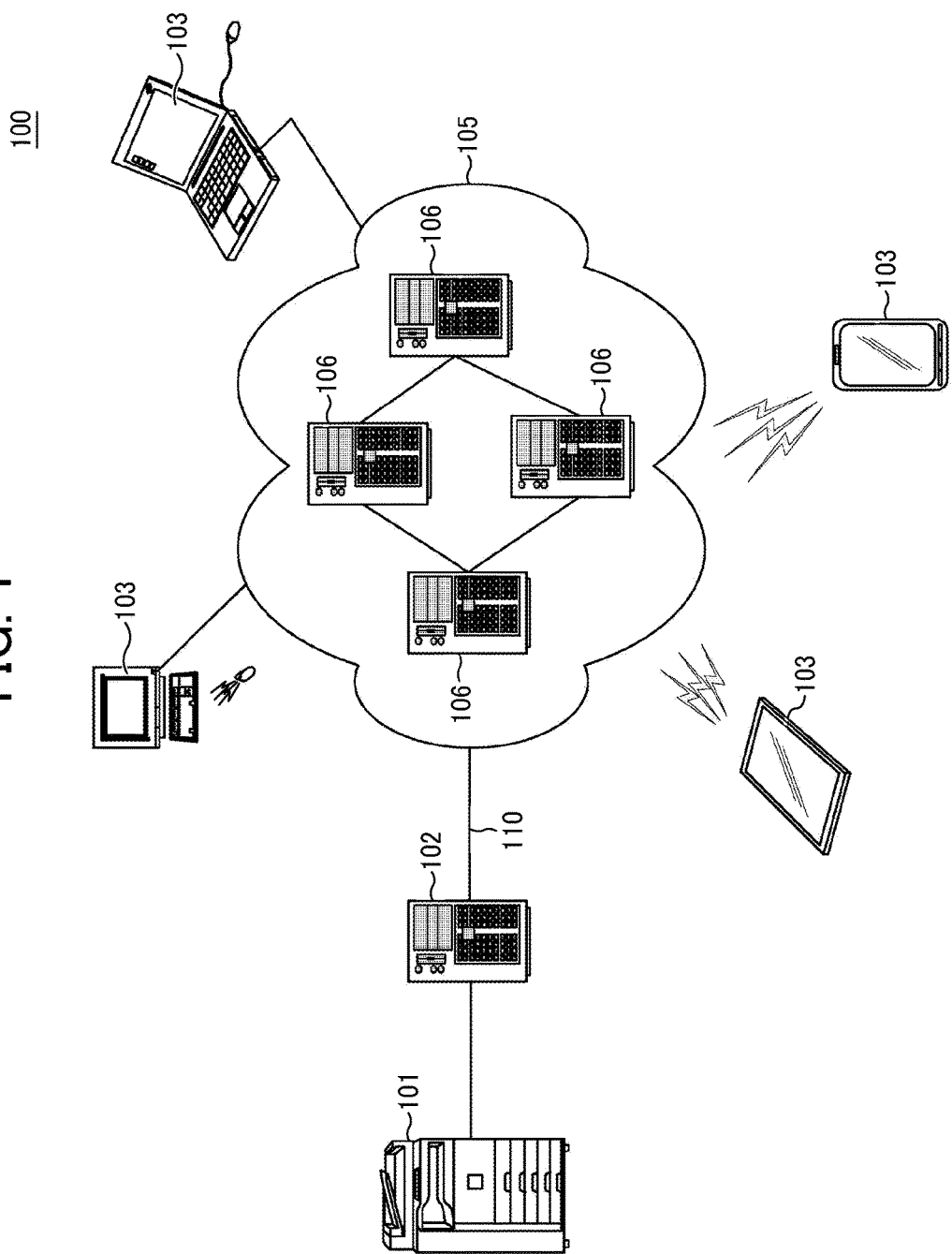
FIG. 1 is a schematic diagram illustrating a configuration of an information processing system according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Several example embodiments of the present invention will be described hereinafter with reference to drawings.

FIG. 1 is a schematic diagram illustrating a configuration of an information processing system 100 according to an embodiment. The information processing system 100 includes a plurality of information processing apparatuses connected to a network 105. Specifically, as illustrated in FIG. 1, an image processing apparatus 101 and terminals 103 are connected to the network 105. The image processing apparatus 101 is implemented by, for example, a multiple peripheral (MFP). The terminal 103 is implemented by, for example, a personal computer, a tablet computer, a laptop computer, or a smartphone. The image processing apparatus 101 and the terminal 103 each are exemplary, and the information processing apparatus may be any other apparatuses or devices.

The image processing apparatus 101 is placed, for example, in an office, to perform various processing such as scanning, facsimile transmission, data access processing, image processing, access control, and printing processing in response to requests from a user directly or indirectly via the terminal 103. The image processing apparatus 101 connects to the network 105 via a local area network (LAN) 110 that uses a protocol such as the Ethernet (registered trademark) and IEEE 802.11x. The network 105 is a wide area network such as the Internet. A plurality of servers 106 are connected to the network 105. The servers 106 operate in cooperation with one other to process the request from the image processing apparatus 101. In this embodiment, the network 105 provides an infrastructure for providing a so-called cloud service.

Examples of a proxy server 102 and the server 106 include a web server, a storage server, a search engine, an authentication server, and various appliance servers configured for other various uses. In this embodiment, each terminal 103 requests a service from the image processing apparatus 101 through at least one of the network 105 and the LAN 110. The terminal 103 requests a variety of services from the image processing apparatus 101. In order to provide the requested service, the image processing apparatus 101 issues a processing request to the server 106 through the LAN 110, the proxy server 102 and the network 105.

In response to receiving the processing request, the server 106 executes the requested processing by itself or in cooperation with one or more other servers 106 as needed. Further, the server 106 sends a processing result to the image processing apparatus 101 as a response to the request. The image processing apparatus 101 sends the obtained result back to the terminal 103 together with processing by the image processing apparatus 101. Alternatively, the image processing apparatus 101 outputs a recording medium on which an image is formed using an output function that the image processing apparatus 101 includes. With the configurations and operations as described above, the information processing system 100 including the terminals 103 and the servers 106 operates. The image processing apparatus 101 uses information acquired from the cloud service to flexibly expand an image processing function, a scanning function, a data retrieval function, and an authentication function with a minimum modification to hardware and software resources of the image processing apparatus 101.

More specifically, the image processing apparatus 101 is not capable of performing various processing as described above (scanning, facsimile transmission, etc.) by alone, but becomes capable of performing various processing in cooperation with the plurality of servers 106. That is, in response to a request from the user operating the image processing apparatus 101, one or more servers of the servers 106 provide services, such as specific application, to the image processing apparatus 101 to perform processing according to the request. Accordingly, connecting to the servers 106 via the network 105 should be firstly performed right after the image processing apparatus 101 is shipped to the customer side.

The server 106 is implemented by a computer including a central processing unit (CPU), a random access memory (RAM), a read only memory (ROM), and other hardware resources. Examples of the CPU includes, PENTIUM (registered trademark) to PENTIUM IV (registered trademark), a series of CORE (registered trademark), a series of CORE I, XEON (registered trademark), a PENTIUM-compatible CPU, POWER PC (registered trademark), and MIPS.

Examples of an operating system installed on the computer as the server 106 includes Windows (registered trademark), Windows 200x Server, UNIX (registered trademark), AIX (registered trademark), LINUX (registered trademark), and other suitable operating systems. Further, the server 106 stores and executes application programs operating on the above-described operating systems. The application programs are described by programming languages such as C, and object-oriented programming languages such as C++, Visual C++, Visual Basic, Java (registered trademark), Perl, Ruby, and PHP. The program may be distributed as being stored in the recording medium as described above.

Furthermore, the terminal 103 is also implemented by a computer having the same or substantially the same configuration as that of the server 106, although the computers as the terminal 103 and the server 106 have different performances from each other.

Figure 2:
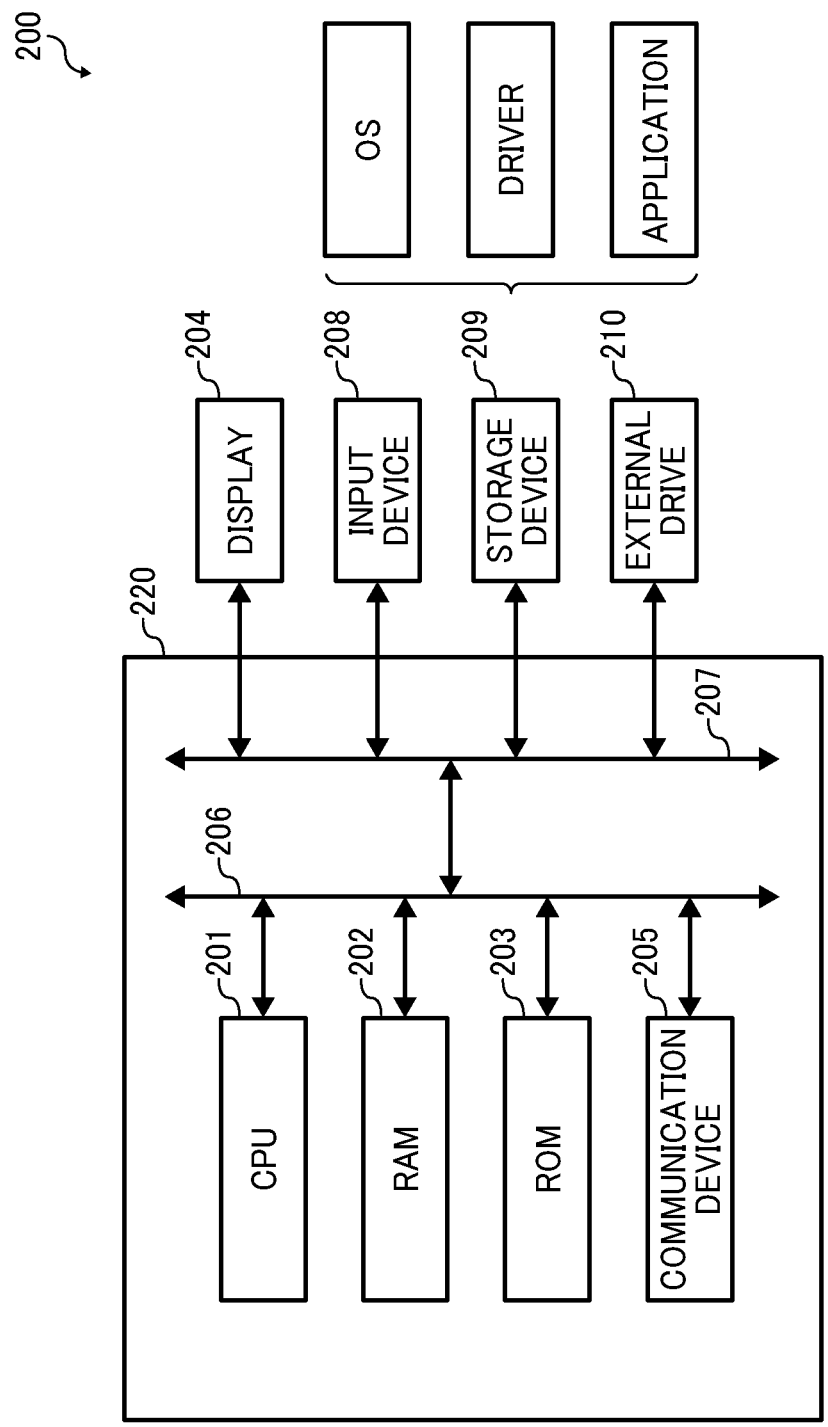
FIG. 2 is a block diagram illustrating a hardware configuration of an image processing apparatus according to an embodiment of the present invention.

FIG. 2 is a block diagram illustrating a hardware configuration 200 of the image processing apparatus 101 according to this embodiment. In this embodiment, the image processing apparatus 101 includes a control unit 220 having the same or substantially the same configuration as that of the computer. Specifically, the control unit 220 of the image processing apparatus 101 includes a CPU 201, a RAM 202, a ROM 203, and a communication device 205, which are connected to one other via a system bus 206. Further, the control unit 220 includes an input/output (I/O)

bus 207 connected to the system bus 206 via a bus bridge such as a peripheral component interconnect (PCI) and PCI Express. Furthermore, the image processing apparatus 101 includes a display 204, an input device 208 such as a keyboard and a mouse, and a storage device 209 such as a hard disc drive (HDD). The image processing apparatus 101 may be freely connected to an external drive 210 such as a digital versatile disc (DVD) drive. The input device 208 may be a touch panel provided on the display 204. The display 204, the input device 208, the storage device 209, and the external drive 210 are connected to the I/O bus 207 via any suitable protocol. The external drive 210 is communicably connected to each of the input device 208, the storage device 209, and the CPU 201.

Examples of the CPU 201 includes, PENTIUM (registered trademark) to PENTIUM IV (registered trademark), ATOM (registered trademark), a PENTIUM-compatible CPU, POWER PC (registered trademark), and MIPS.

Examples of an operating system installed on the image processing apparatus includes MacOS (registered trademark), Windows (registered trademark), CHROME (registered trademark), Windows 200x Server, UNIX (registered trademark), AIX (registered trademark), LINUX (registered trademark), and other suitable operating systems. Further, the CPU 201 executes application programs stored in the ROM 203. The application programs operate on the above-described operating systems. The application programs are described by programming languages such as programming languages such as C, C++, Visual C++, Visual Basic, Java (registered trademark), Perl, and Ruby.

Further, the image processing apparatus 101 is installed with at least browser application, which communicates with at least one of the plurality of servers 106. Specifically, as described below, various screens to be used for network configuration (such as the screens 501 and 502 illustrated in FIG. 5) to be displayed before the user can login, may be previously stored in any desired memory of the image processing apparatus 101. With those screens being stored at the image processing apparatus 101, the user at the image processing apparatus 101 can at least instruct to start network configuration operation.

Once the user logs into the cloud service provided by the servers 106, the image processing apparatus 101 receives various display data from one or more of the servers 106, for display to the user.

Figure 3:
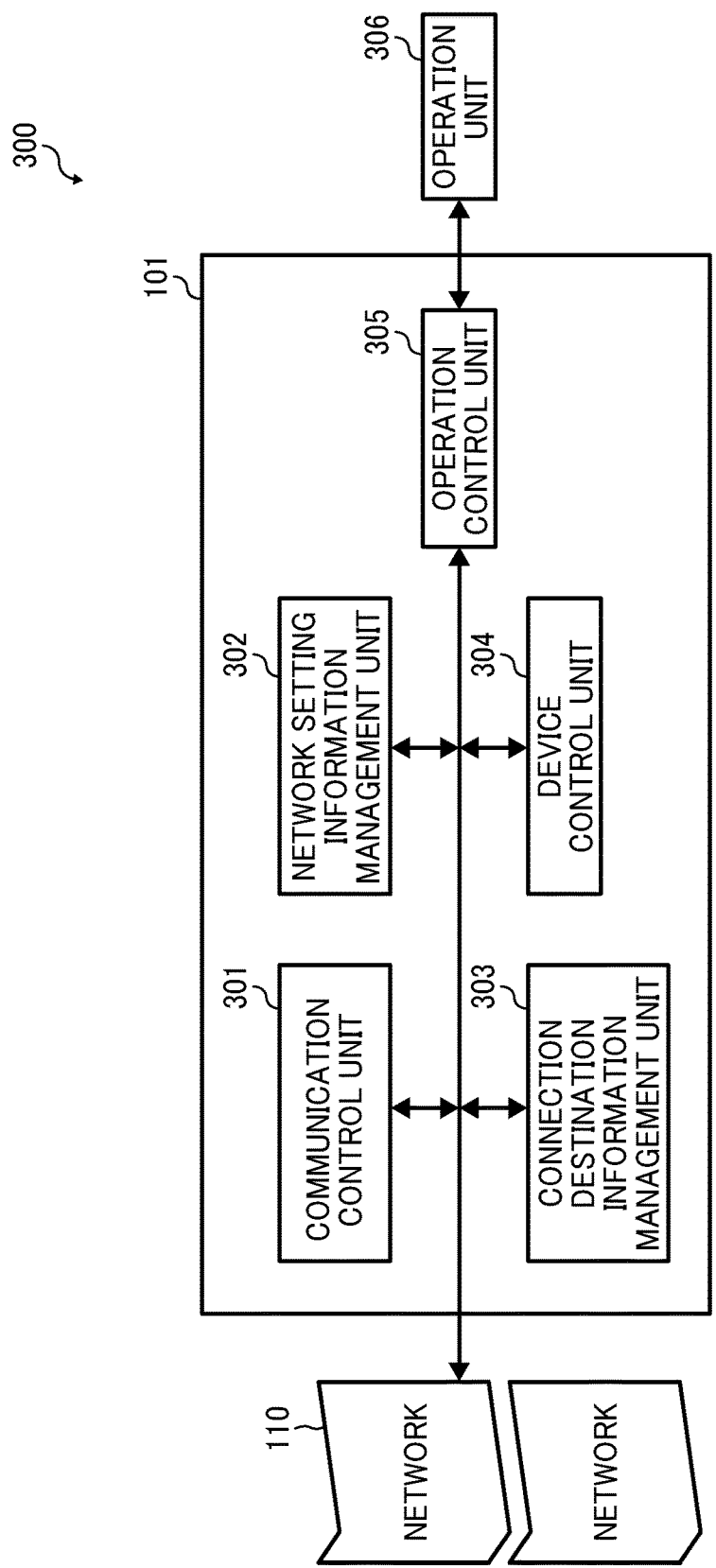
FIG. 3 is a block diagram illustrating a functional configuration of the image processing apparatus according to an embodiment of the present invention.

FIG. 3 is a block diagram illustrating a functional configuration 300 of the image processing apparatus 101 according to this embodiment. Each functional block in the functional configuration 300 illustrated in FIG. 3 is implement by the application programs loaded onto the RAM 202, which operate, under control of the CPU 201, in cooperation with hardware of the image processing apparatus 101 as illustrated in FIG. 2

The image processing apparatus 101 includes a communication control unit 301, a connection destination information management unit 303, and a device control unit 304. The communication control unit 301, which is implemented by the CPU 201 and the communication device 205, generates communication packets using a specified protocol to send the communication packets to the LAN 110 with a protocol such as IPv4 and IPv6 using the TCP/IP protocol.

The connection destination information management unit 303, which may be implemented by the CPU 201 and a memory such as the RAM 202, stores connection destination information of each of the servers 106 that provide the cloud service. More specifically, the connection destination information management unit 303 stores an IP address of each server 106. The connection destination information management unit 303 enables the image processing apparatus 101 to connect to each server 106 using the stored IP address. In alternative to the IP address, any other destination information may be used as long as it is capable of identifying the destination address of each server 106.

The device control unit 304 controls an entire operation of the image processing apparatus 101, for example, to perform various processing as requested by the user using the services provided by the servers 106. The image processing apparatus 101 further includes a network setting information management unit 302, an operation control unit 305, and an operation unit 306.

The network setting information management unit 302, which may be implemented by the CPU 201 and a memory such the RAM 202, stores a collection of lists or tables, each containing possible network setting information used by the image processing apparatus 101 when firstly connecting to the network 15. The network setting information management unit 302 functions when network settings are not configured on the image processing apparatus 101, for example, when the image processing apparatus 101 is activated for the first time after installation. Specifically, the network setting information management unit 302 provides the communication control unit 301 with the lists of the network setting information in the descending order of probability in succeeding network connection. An example list of the network setting information is described below referring to FIG. 6.

The lists of network setting information are previously stored in the memory of the image processing apparatus 101, such that the probability in succeeding network connection, or any other order of network settings to be tried, is previously determined, for example, by a provider of the image processing apparatus 101.

The operation unit 306 generates and displays a screen that guides the user to give an instruction in response to an instruction from the operation control unit 305. The operation unit 306 is implemented by, for example, the display 204 on which the touch panel as the input device 208 is provided. The user gives an instruction to the image processing apparatus 101 via the screen displayed on the operation unit 306.

The communication control unit 301 acquires a first network setting information from the network setting information management unit 302. Further, the communication control unit 301 generates the communication packets based on the network setting information acquired from the network setting information management unit 302 and the IP address acquired from the connection destination information management unit 303. The communication control unit 301 sends the generated communication packets to the LAN 110. The communication packets sent to the LAN 110 are sent to the server 106 via the LAN 110 and the network 105. The communication packets sent from the image processing apparatus 101 do not always meet a communication environment and communication conditions of the server 106. In this case, the server 106 as the connection destination sends back a specific error code such as HTTP 400 and HTTP 500 to the communication control unit 301, in a case where the server 106 uses the HTTP protocol.

The communication control unit 301 interprets the response from the server 106 as the connection destination. Specifically, when the communication control unit 301 receives no response from the server 106 or receives the error code from the server 106, the communication control unit 301 acquires a second network setting information from the network setting information management unit 302. The communication control unit 301 retries to access the server 106 using the acquired second network setting information. When the communication control unit 301 receives a positive response from the server 106, the used network setting information is stored in the storage device 209, which is a nonvolatile storage such as the HDD. The image processing apparatus 101 uses the network setting information stored in the storage device 209 until the image processing apparatus 101 is initialized or the network configuration is changed.

With the configurations and operations described heretofore, the network connection is established in an effective manner without requiring the user to directly configure network settings in the image processing apparatus 101 or asking for a service person. In other words, in the image processing apparatus 101, which operates in cooperation with the servers 106 that provide the cloud service, the network settings are configured without requiring the user's advanced knowledge about Internet technology.

Figure 4:
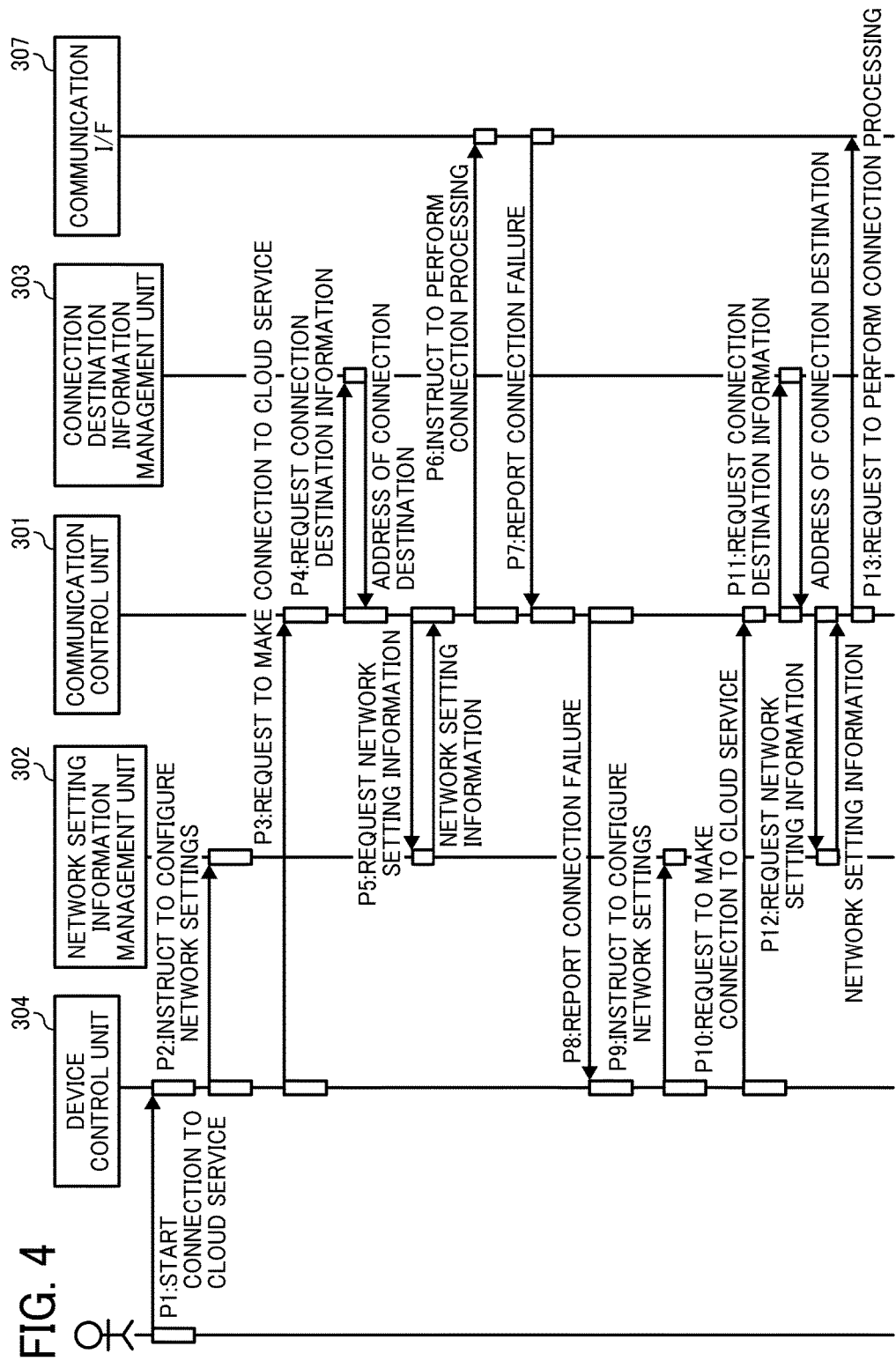
FIG. 4 is a sequence diagram illustrating an operation of configuring network settings performed by the image processing apparatus according to an embodiment of the present invention.

FIG. 4 is a sequence diagram illustrating an operation of configuring network settings performed by the image processing apparatus 101 according to this embodiment. First, at P1, the device control unit 35 receives, from a user, an instruction for connecting the image processing apparatus 101 to the cloud service via the network 105. At P2, the device control unit 304 gives an instruction for configuring the network settings to the network setting information management unit 302. Further, at P3, the device control unit 304 instructs the communication control unit 301 to make a connection to the cloud service.

At P4, in response to receiving the instruction for connection to the cloud service, the communication control unit 301 requests the connection destination information management unit 303 for the connection destination information, and receives the connection destination information such as the address of the connection destination. At P5, the communication control unit 301 requests the network setting information management unit 302 for the network setting information, and receives the network setting information. The communication control unit 301 configures the network settings using the network setting information acquired from the network setting information management unit 302.

Thereafter, at P6, the communication control unit 301 sends the communication packets to a communication interface 307 to instruct the communication interface 307 to perform connection processing. The communication interface 307 is implemented by, for example, an Ethernet communication interface circuit or a wireless communication interface circuit. The communication interface 307 sends the communication packets to at least one of the servers 106 as the connection destination via the LAN 110 and waits for a reply from the server 106. In this embodiment, it is assumed that the network setting information acquired at P5 is not suitable one, and the communication interface 307 receives no reply or a failure notification from the server 106 via the network 105. In this case, at P7, the communication interface 307 sends a reply packet to the communication control unit 301 to report a connection failure. At P8, the communication control unit 301 reports the connection failure to the device control unit 304. In response to receiving the report, the communication control unit 301 reports the connection failure to the device control unit 304. Further, at P9, the communication control unit 301 instructs the device control unit 304 to configure the network settings again. At P10, the device control unit 304 instructs the communication control unit 301 to retry the connection to the cloud service.

At P11, in response to receiving the instruction for the retry of connection to the cloud service, the communication control unit 301 requests the connection destination information management unit 303 for the connection destination information, and acquires the connection destination information such as the address of the connection destination. At P12, the communication control unit 301 requests the network setting information management unit 302 for the network setting information to acquire the network setting information. The communication control unit 301 configures the network settings using the network setting information acquired at P12. Note that, the network setting information acquired at P12 and the network setting information acquired at P5 are different from each other. In other words, the network setting information acquired at P12 has less probability than the network setting information acquired at P5 among the lists of possible network setting information stored in the network setting information management unit 302.

Thereafter, at P13, the communication control unit 301 sends the communication packets to the communication interface 307 to instruct the communication interface 307 to perform connection processing. The communication interface 307 sends the communication packets to at least one of the servers 106 as the connection destination via the LAN 110 and waits for a reply from the server 106. In this embodiment, for simplicity, it is assumed that the network setting information acquired at P12 is suitable, and the communication interface 307 succeeds in making a connection to the server 106 as the connection destination.

The above-described operation of retrying connection using a different network setting information is repeated, until the network connection succeeds.

The image processing apparatus 101 stores the network setting information, based on which the connection is established, in the storage device 209. Thereafter, the image processing apparatus 101 uses the network setting information stored in the storage device 209 each time it accesses the cloud service provided by the servers 106. With the above-described operation performed by the image processing apparatus 101, the user of the image processing apparatus 101 obtains the cloud service provided by the servers 106 without configuring the complicated network settings or asking for a service person.

Figure 5:
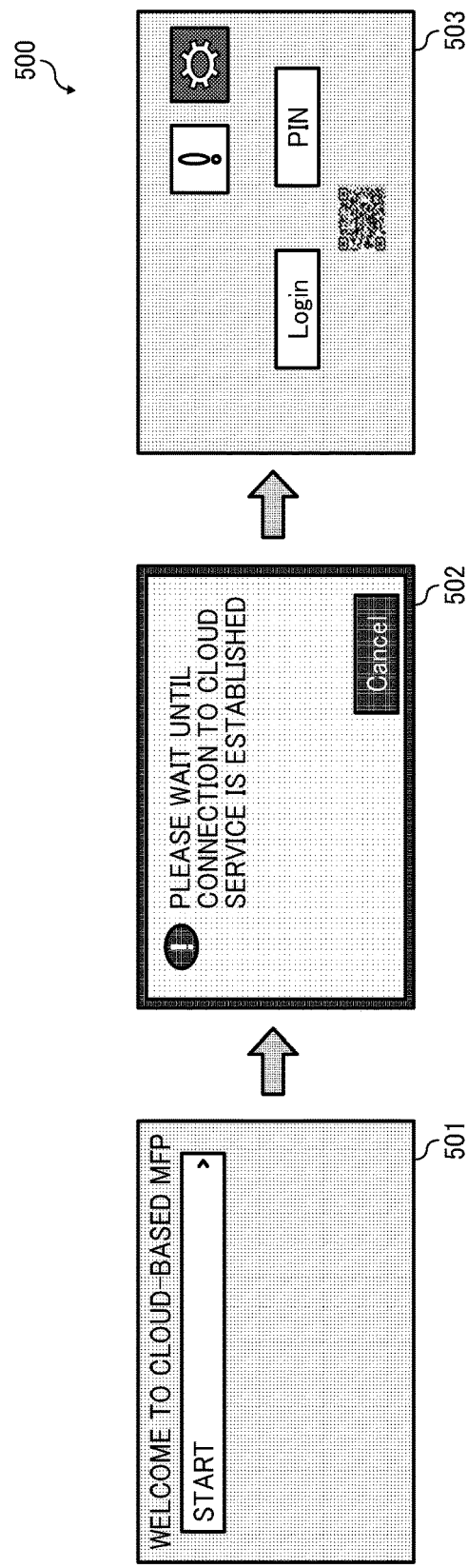
FIG. 5 illustrates screens displayed on the image processing apparatus according to an embodiment of the present invention.

FIG. 5 illustrates an example of a series of screens 500 displayed on the operation unit 306 of the image processing apparatus 101. A screen 501 illustrated in FIG. 5 enables a user to connect the image processing apparatus 101 to the servers 106 that provide the cloud service. The user selects a key "START" on the screen 501 via the touch panel as the input device 204 to instruct a connection to the cloud service. A screen 502 illustrated in FIG. 5 is displayed while the image processing apparatus 101 is trying to access the cloud service using the lists of the network connection information.

When the image processing apparatus 101 succeeds in connecting to the cloud service, a screen 503 as illustrated in FIG. 5 is displayed. The screen 503 includes a login key, and a "PIN" key that enables the user to enter an authentication code for the cloud service. The screen also includes a matrix code that enables the user to acquire other information and icons that enable the user to configure various settings. The image processing apparatus 101 displays the screens 501 to 503 to allow the user recognize the processing step performed by the image processing apparatus 101. Accordingly, the user may feel assured.

FIG. 6 is an example of a list 600 of the network setting information according to this embodiment. The network setting information in this embodiment includes a protocol of each of the application layer, the transport layer, the network layer, and the data link/physical layer in the Open Systems Interconnection (OSI) reference model. For example, in the application layer, use of the DHCP service, use of the DNS service, and use of the proxy service are set.

The setting value to each of the parameters indicates "valid" or "invalid". In addition, other parameters are set in the application layer such as a port number used for the HTTP, a port number used for the file transfer protocol (FTP), a port number for the simple mail transfer protocol (SMTP), and a port number for the post office protocol (POP).

Further, the settings in the transport layer include the validity or invalidity of the TCP protocol, the port number, the validity or invalidity of the user datagram protocol (UDP), and the port number. Furthermore, the settings in the network layer include a protocol suite used for connection. Still further, the settings in the data link/physical layer include a connection protocol, a tunneling (i.e., virtual private network (VPN)), and a physical medium.

These parameters are exemplary, and other parameters used for connection may be set as needed in this embodiment. Further, one or more other lists are prepared and stored in the network setting information management unit 302. Each of the other lists includes different settings from those of the list 600, although the other lists and the list 600 have the same or substantially the same format. The image processing apparatus 101 tries to make a connection to the cloud service using the list 600 and other different lists until the image processing apparatus 101 succeeds in connecting to the cloud service.

Figure 7B:
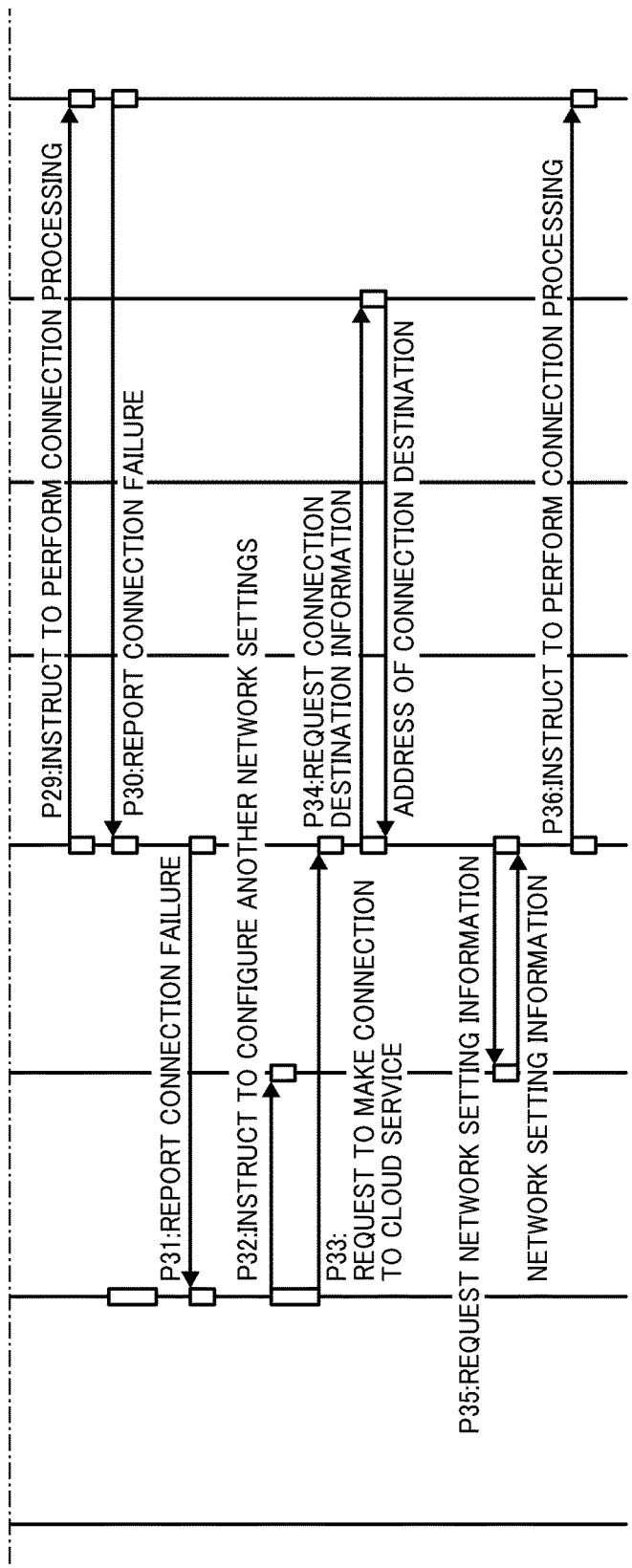

FIGS. 7A and 7B are a sequence diagram illustrating an operation performed by the image processing apparatus 101 when the image processing apparatus 101 is not physically connected to the network 105 according to this embodiment. The status in which the image processing apparatus 101 is not physically connected to the network 105 indicates a problem on a level of the physical layer, such as a status in which an Ethernet cable is technically disconnected and a status in which a handshake with the access point of the wireless LAN is not yet performed.

The operation illustrated in FIGS. 7A and 7B is different from that illustrated in FIG. 4 in that the operational step P21 to P24 in a box 700 are added. Other operational steps are the same or substantially the same as those of FIG. 4, and redundant description is omitted below. At P21, in response to the instruction from the user to connect the image processing apparatus 101 to the cloud service, the device control unit 304 checks for network connection. Specifically, the device control unit 304 tries communication to a known address by the ARP protocol or the PING-ICPM protocol. Thus, the image processing apparatus 101 notifies the user of a connection status.

In this embodiment, based on the check result at P21 indicating that the physical medium for communication is not secured, the communication control unit 301 reports the connection failure to the device control unit 304. At P22, the device control unit 304 instructs the operation control unit 305 to display a screen that guides the user to connect the image processing apparatus 101 to the network 105. At P23, the operation control unit 305 instructs the operation unit 306 to generate the screen for guiding the connection.

When the user recognizes the screen on the operation unit 306, the user connects the image processing apparatus 101 to a hub or a switch via a Ethernet cable, performs a handshake between the wireless LAN access point and the image processing apparatus 101, or checks the status of the wireless LAN access point to physically connect the image processing apparatus 101 to the network. When the physical connection is established, at P24, the user notifies the device control unit 304 of the completion of the physical connection. Thereafter, the image processing apparatus 101 performs the same or substantially the same processing as that of FIG. 4 to connect to the cloud service.

FIG. 8 illustrates an example of a series of screens 800 displayed on the operation unit 306 of the image processing apparatus 101 according to the operation illustrated in FIGS. 7A and 7B. In an example of FIG. 8, when the user selects "START" on a screen 801 to give an instruction to connect the image processing apparatus 101 to the cloud service, the image processing apparatus 101 checks the network connection. When the check result indicates that the connection to the network has failed, the operation unit 306 of the image processing apparatus 101 displays a screen 802 to notify the user that there is a problem in the network connection. After establishing the physical connection between the image processing apparatus 101 and the network 105, the user selects a "CONTINUE" key on the screen 802. In response to the selection of the "CONTINUE" key, an instruction is generated for notifying the device control unit 304 of the completion of the connection to the network. Thereafter, the operation unit 306 displays screens 803 and 804, which respectively correspond to the screens 502 and 503 illustrated in FIG. 5. Thus, the user is able to obtain the cloud service from the servers 106 in an effective manner.

Figure 9B:
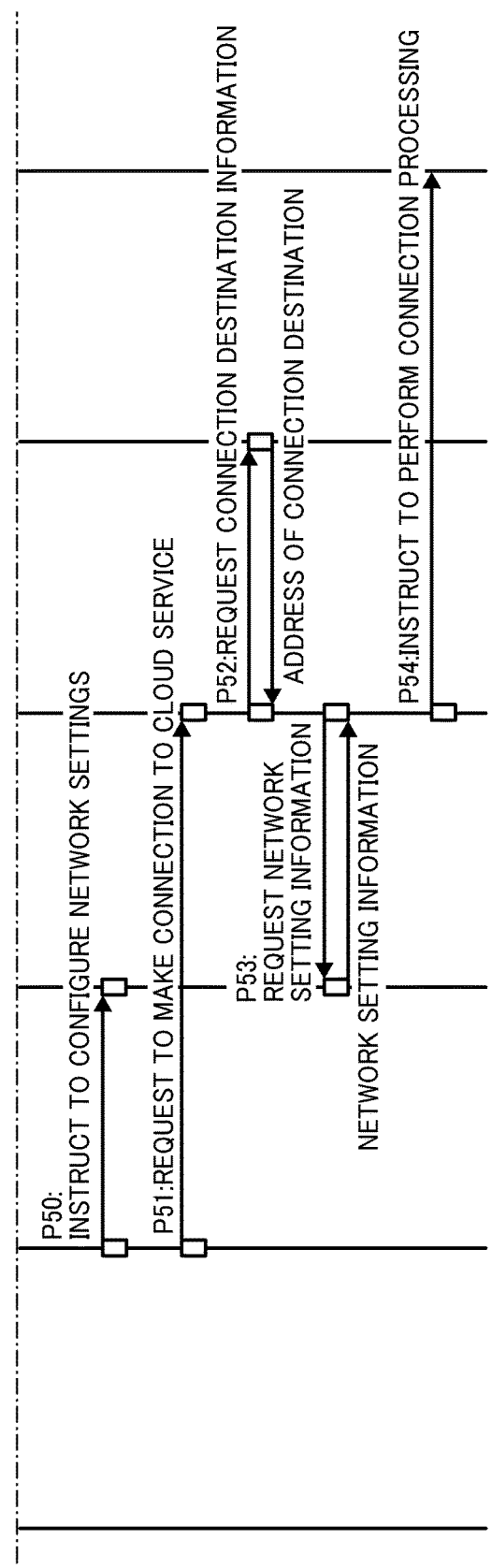

FIGS. 9A and 9B are a sequence diagram illustrating an operation of configuring the network settings according to another embodiment of the present invention. The operation illustrated in FIGS. 9A and 9B is performed when the connection destination information is to be updated to access the cloud service in a different country. In this case, at P4, the user gives an instruction for selecting a country where the connection destination is located to the image processing apparatus 101. At P41, the device control unit 304 gives an instruction for updating the connection destination information to the connection destination information management unit 303.

Subsequently, at P42, the user gives an instruction for connecting to the cloud service. In response to receiving the instruction from the user, at P43, the device control unit 304 instructs the network setting information management unit 302 to configure the network settings. Thereafter, the image processing apparatus 101 performs the same or substantially the same processing as that of FIG. 4. Thus, the user is able to obtain the service provided by at least one of the servers 106 without being required the user's advanced knowledge about network settings.

FIG. 10 is an example of connection destination information 1000, which is referred to when the country of the connection destination is changed in this embodiment. Country information is set for each of tails of the domain names such as Japan, the United States, the United Kingdom, and France. When the user specifies the county to be accessed, the network address providing a desired cloud service is selected from the classified network addresses of the corresponding country with the following processing.

Figure 11:
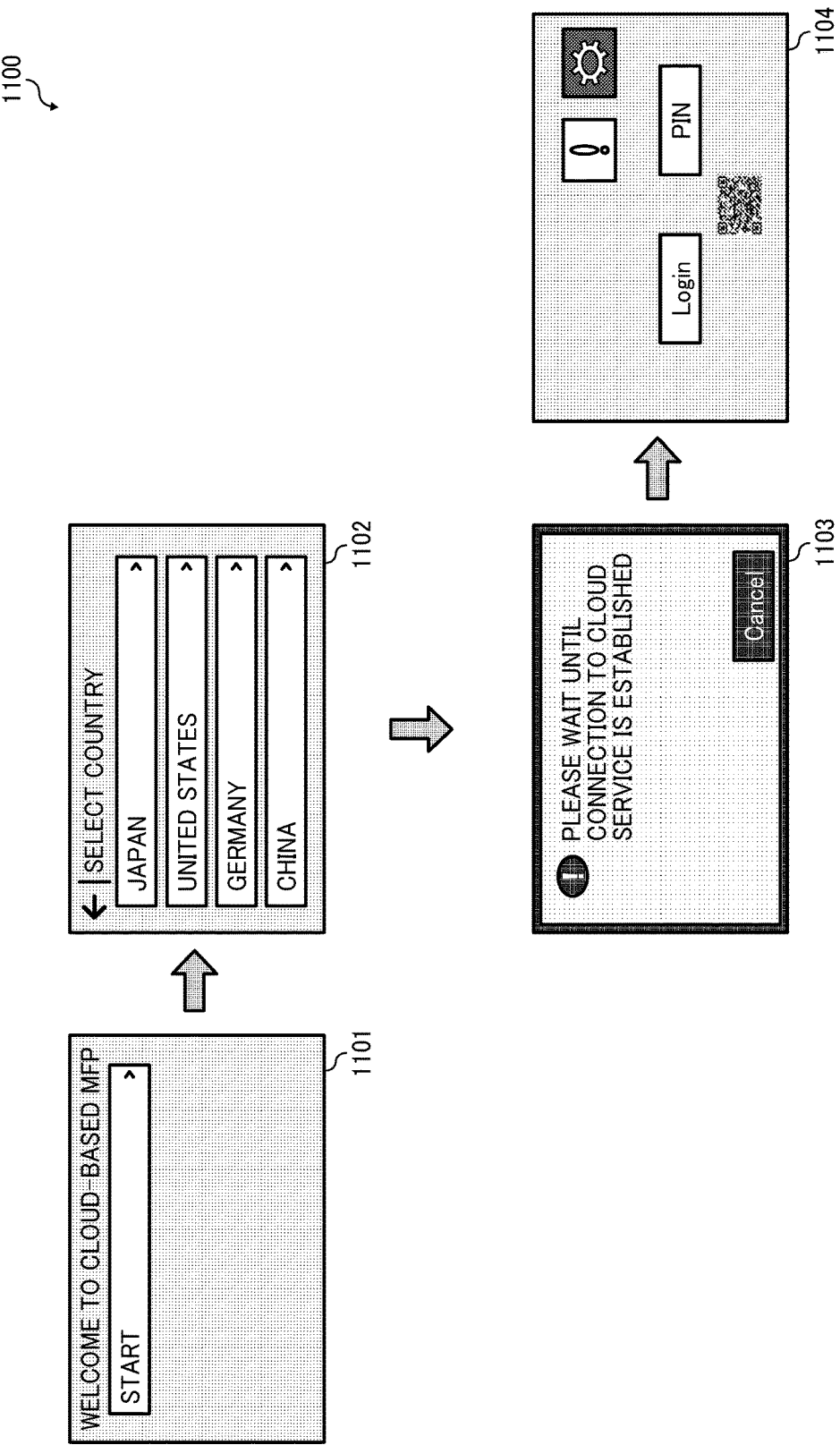
FIG. 11 illustrates screens displayed by the operation unit of the image processing apparatus according to the operation illustrated in FIGS. 9A and 9B.

FIG. 11 illustrates an example of a series of screens 1100 displayed on the operation unit 306 of the image processing apparatus 101 according to the operation illustrated in FIGS. 9A and 9B. In an example of FIG. 11, when the user selects "START" on a screen 1101 to give an instruction to connect to the cloud service, the operation control unit 305 instructs the operation unit 306 to display a screen 1102 that enables the user to change the country information of the connection destination. The user selects the country of the connection destination on the screen 1102. The screen 1102 corresponds to a county selection screen in this embodiment. In response to the user instruction for changing the country to be accessed, the image processing apparatus 101 reads out a country list stored in any desired memory. Thereafter, the operation control unit 305 instructs the operation unit 306 to display a screen 1103 while the image processing apparatus 101 is trying to connect to the cloud service based on the updated connection destination information. When the image processing apparatus 101 succeeds in connecting to the cloud service, the operation unit 306 displays a screen 1104, which corresponds to the screen 503 illustrated in FIG. 5. Thus, the user is able to obtain the cloud service from the servers 106 in an effective manner.

Figure 12:
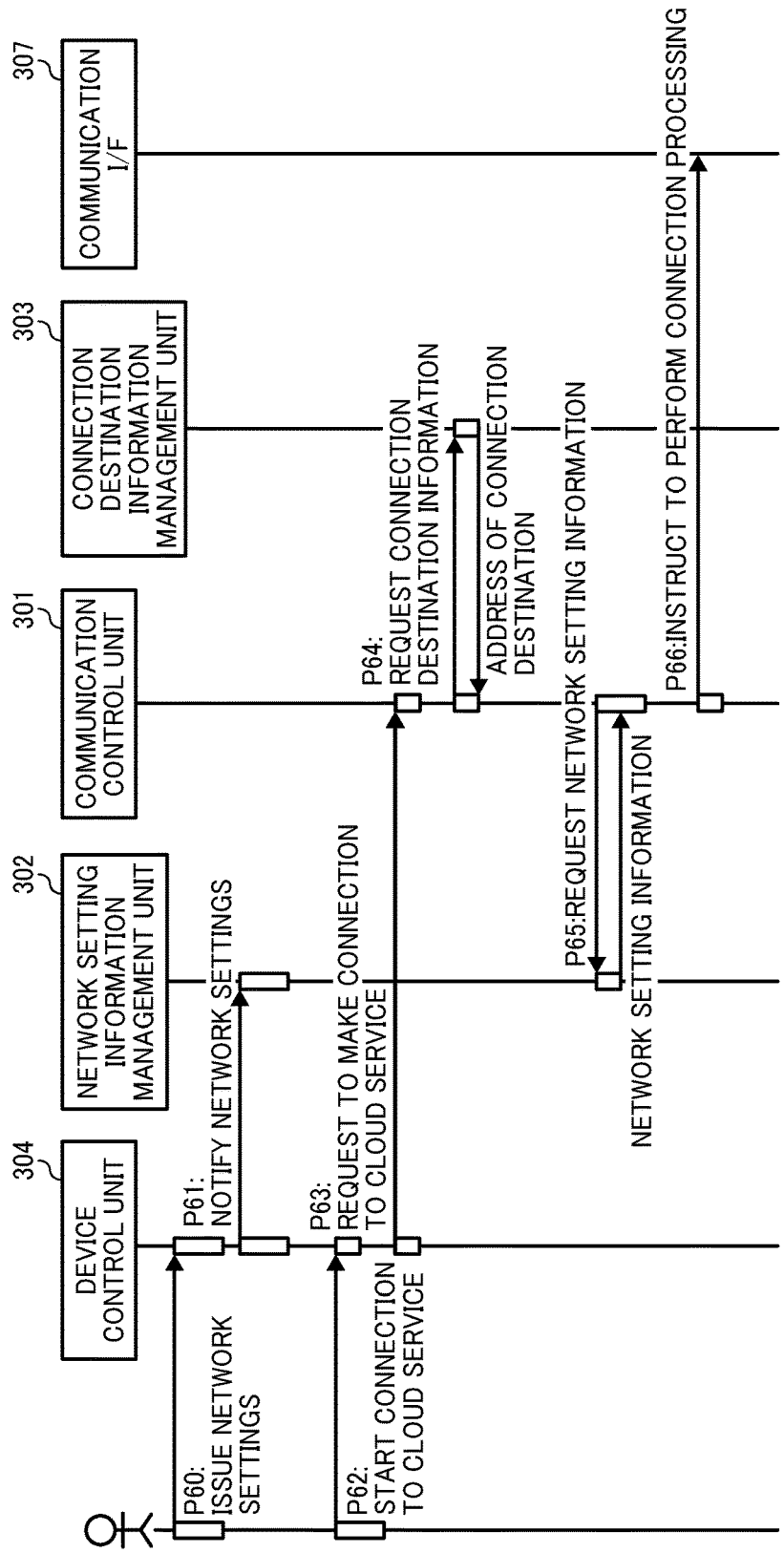
FIG. 12 is a sequence diagram illustrating an operation of configuring the network settings based according to still another embodiment of the present invention.

FIG. 12 is a sequence diagram illustrating an operation of configuring network settings according to still another embodiment. The operation illustrated in FIG. 12 is applicable when an organization to which the user belong has the network setting information set in advance such as a protocol suite including an IP address or proxy settings. First, at P60, the user provides the device control unit 304 with the network setting information. At P61, the device control unit 304 notifies the network setting information management unit 302 of the specified network setting information. Thereafter, at P62, the user gives an instruction for connecting the image processing apparatus to the cloud service to the device control unit 304. At P63, the device control unit 304 instructs the communication control unit 301 to connect to the cloud service.

From P64 to P66, the communication control unit 301 and the network setting information management unit 302 perform the same or substantially the same processing as that of P11 to P13 to enable the user to obtain the service provided by at least one of the servers 106. In particular, at P65, the network setting information management unit 302 provides the communication control unit 301 with the same network setting information as that specified by the user at P60. Accordingly, the image processing apparatus 101 is able to connect to the cloud service in an effective manner.

Figure 13:
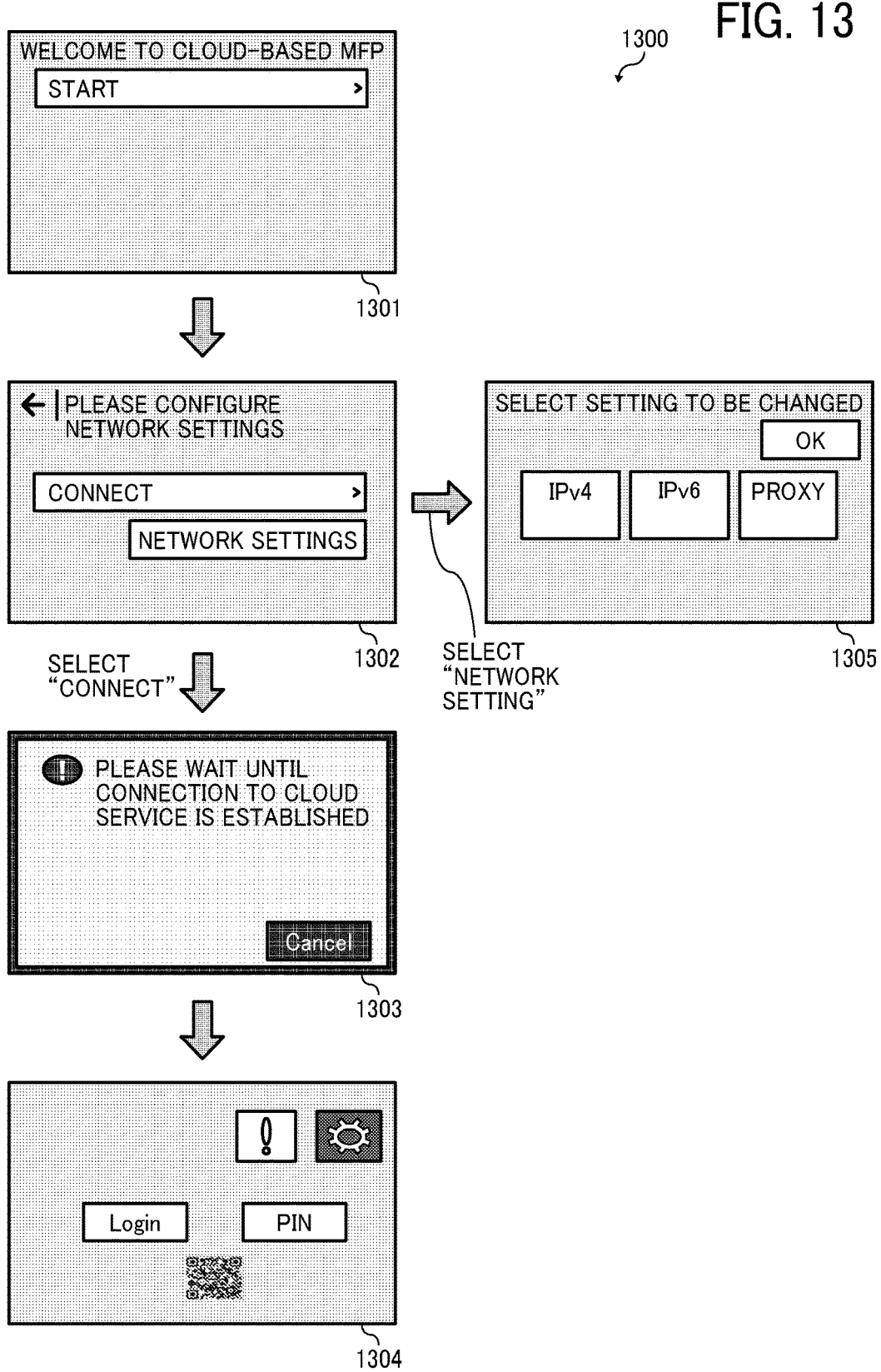
FIG. 13 illustrates screens displayed by the operation unit according to the operation illustrated in FIG. 12.

FIG. 13 illustrates an example of a series of screens 1300 displayed on the operation unit 306 according to the operation illustrated in FIG. 12. As illustrated in FIG. 13, a screen 1302 and a screen 1305 are added to the screens illustrated in FIG. 5. The screen 1302 includes a key that enables the user to configure the network settings. Specifically, in response to the user selection of a "CONNECT" key on the screen 1302, the image processing apparatus 101 performs the same or substantially the same operation as that of FIG. 4.

By contrast, when the user selects a "NETWORK SETTING" key on the screen 1302, the operation unit 306 displays a screen 1305 as illustrated in FIG. 13. The screen 1305 allows the user to enter IP version information, the IP address and port number of the proxy server 102, which are determined in advance on the part of the user, to configure the network settings. When the user finishes configuring the network settings and selects an "OK" button on the screen 1305, the operation unit 306 displays a screen 1303 while the image processing apparatus 101 is trying to connect to the cloud service using the network settings specified on the screen 1302.

FIG. 14 is an example of a list 1400 in which the network setting items and setting values illustrated in FIG. 6 are specified in detail. As illustrated in FIG. 14, some network setting items require the settings of numeric information in addition to the setting of validity or invalidity. Configuring network settings including that numeric information can be burdensome for the user who is not an expert on network settings, as the image processing apparatus 101 requires the user to make unique operations different from those required by a personal computer.

According to the above-described embodiments, the image processing apparatus 101 selects the network setting information from the lists of the network setting information in the descending order of probability in succeeding network connection to connect the image processing apparatus 101 to the cloud service. Accordingly, the user is able to make an effective use of functions of the image processing apparatus 101 in cooperation with the cloud service. Further, a vendor is able to reduce the number of times they send a service person to a customer (user). In addition, it is possible to reduce burdens on the user. Thus, an effective use of the cloud service is implemented on the parts of both the user and the vendor.

In FIG. 14, the IP version, the validity of proxy, the proxy address, and the port number of proxy are specified via the screen 1305 illustrated in FIG. 13. However, these settings are exemplary. Alternatively, according to this embodiment, other values to be uniquely set on the part of the user are manually set in advance, and the other information may be automatically acquired.

According to at least one of the embodiments of the present invention, the network settings are configured in an effective manner on the information processing apparatus that uses the cloud service.

After the image processing apparatus 101 connects to the servers 106, the image processing apparatus 101 requests the servers 106 for a specific service in response to a request input from the user. For example, in response to a request for printing, the image processing apparatus 101 requests the servers 106 for printing service, and controls hardware (such as printer) to perform printing according to the printing service provided by the servers 106.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet.

What is claimed is:

1. An information processing apparatus configured to connect to a cloud server through a network, the cloud server including a plurality of servers providing a cloud service, the information processing apparatus comprising:
   a memory to store connection destination information indicating a connection destination of each one of the plurality of servers in the cloud server, and a plurality of network setting information lists, each of the plurality of network setting information lists being usable for establishing a network connection with the cloud server and being stored in the memory in association with a respective probability of successfully establishing the network connection between the information processing apparatus and the cloud server; and
   circuitry to, in response to receiving a user instruction for connecting the information processing apparatus to the cloud server, acquire the connection destination information and the network setting information lists one by one in a descending order of probability of successfully establishing the network connection from the memory, and repeat operations of connecting the information processing apparatus to the cloud server using the acquired connection destination information and the acquired network setting information lists until the network connection is established with the cloud server, including
      acquiring a first network setting information list having a highest probability of successfully establishing the network connection from the memory,
      generating one or more first communication packets, and sending the one or more first communication packets to at least one of the plurality of servers as the connection destination via the network, using the acquired connection destination information and the acquired first network setting information list, and
      in response to receiving a failure notification or no reply from the at least one of the plurality of servers, acquiring a second network setting information list having a second highest probability of successfully establishing the network connection from the memory, and
      generating one or more second communication packets, and sending the one or more second communication packets to the at least one of the plurality of servers as the connection destination via the network, using the acquired connection destination information and the acquired second network setting information list, and
   wherein the circuitry is further to control a display device to notify a user of a progress status of the operations of connecting the information processing apparatus to the cloud server.

2. The information processing apparatus of claim 1, wherein the circuitry is further configured to
   control the display device to display a first screen that allows the user to input the user instruction for connecting the information processing apparatus to the cloud server, and
   in response to the user instruction being input through the first screen, control the display device to switch from the first screen to a second screen that informs the user that the information processing apparatus is attempting to connect to the cloud server.

3. The information processing apparatus according to claim 2, wherein the circuitry is further configured to
   in response to receiving the user instruction for connecting the information processing apparatus to the cloud server, determine whether the information processing apparatus is physically connected to the network, and
   in response to determining that the information processing apparatus is not physically connected to the network, control the display device to switch from the first screen to a third screen that guides the user to physically connect the information processing apparatus to the network.

4. The information processing apparatus according to claim 3, wherein the cloud service provided by the plurality of servers in the cloud server expands functions to be provided by the information processing apparatus.

5. The information processing apparatus of claim 3, wherein the third screen instructs the user to connect the information processing apparatus to a hub or switch of the network via an Ethernet cable, or to initiate a handshake between the information processing apparatus and a WLAN access point, to physically connect the information processing apparatus to the network.

6. The information processing apparatus according to claim 1, wherein
   the memory is further configured to store country information indicating a country for each connection destination of the connection destination information, and
   the circuitry is further configured to
      acquire the country information from the memory in response to receiving the user instruction for connecting the information processing apparatus to the cloud server, and
      control the display device to display a screen that lists one or more countries based on the acquired country information for selection by the user.

7. The information processing apparatus according to claim 1, wherein the circuitry is further configured to
   classify network setting information of the plurality of network setting information lists into information that is configurable by the user and other information that is not configurable by the user, and
   in response to receiving the user instruction for connecting the information processing apparatus to the cloud server, control the display device to display a screen that allows the user to enter the information that is configurable by the user, the entered information being used to establish the network connection with the cloud server.

8. The information processing apparatus of claim 1, wherein the connection destination information includes an IP address of each of the plurality of servers in the cloud server.

9. The information processing apparatus of claim 1, wherein the plurality of network setting information lists each include a plurality of layers, one or more parameters to be set for each layer, and a setting value for each parameter.

10. The information processing apparatus of claim 1, wherein at least a subset of network setting information of the acquired second network setting information list is different from a respective subset of network setting information of the acquired first network setting information list.

11. The information processing apparatus of claim 1, wherein the circuitry is further configured to, in response to receiving a success notification from the at least one of the plurality of servers, store whichever one of the acquired network setting information lists, based on which the network connection with the cloud server was successfully established, in a storage device, and use the network setting information list stored in the storage device each time the information processing apparatus accesses the cloud service provided by the plurality of servers.

12. A method for connecting an information processing apparatus to a cloud server via a network, the cloud server including a plurality of servers providing a cloud service, the method comprising:

storing, in a memory, connection destination information indicating a connection destination of each one of the plurality of servers in the cloud server, and a plurality of network setting information lists, each of the plurality of network setting information lists being usable for establishing a network connection with the cloud server and being stored in the memory in association with a respective probability of successfully establishing the network connection between the information processing apparatus and the cloud server;

in response to receiving a user instruction for connecting the information processing apparatus to the cloud server, acquiring the connection destination information and the network setting information lists one by one in a descending order of probability of successfully establishing the network connection from the memory, and repeating operations of connecting the information processing apparatus to the cloud server using the acquired connection destination information and the acquired network setting information lists until the network connection is established with the cloud server, including acquiring a first network setting information list having a highest probability of successfully establishing the network connection from the memory, generating one or more first communication packets, and sending the one or more first communication packets to at least one of the plurality of servers as the connection destination via the network, using the acquired connection destination information and the acquired first network setting information list, and in response to receiving a failure notification or no reply from the at least one of the plurality of servers, acquiring a second network setting information list having a second highest probability of successfully establishing the network connection from the memory, and generating one or more second communication packets, and sending the one or more second communication packets to the at least one of the plurality of servers as the connection destination via the network, using the acquired connection destination information and the acquired second network setting information list; and controlling a display device to notify a user of a progress status of the operations of connecting the information processing apparatus to the cloud server.

13. The method of claim 12, wherein the plurality of network setting information lists each include a plurality of layers, one or more parameters to be set for each layer, and a setting value for each parameter, and at least a subset of network setting information is different in each of the plurality of network setting information lists.

14. The method of claim 12, the method further comprising, in response to receiving a success notification from the at least one of the plurality of servers, storing whichever one of the acquired network setting information lists, based on which the network connection with the cloud server was successfully established, in a storage device, and using the network setting information list stored in the storage device each time the information processing apparatus accesses the cloud service provided by the plurality of servers.

15. A non-transitory computer-readable medium storing a computer-executable program causing an information processing apparatus to perform a method for connecting the information processing apparatus to a cloud server via a network, the cloud server including a plurality of servers providing a cloud service, the computer-executable program when executed by a processor causing the information processing apparatus to:

store, in a memory, connection destination information indicating a connection destination of each one of the plurality of servers in the cloud server, and a plurality of network setting information lists, each of the plurality of network setting information lists being usable for establishing a network connection with the cloud server and being stored in the memory in association with a respective probability of successfully establishing the network connection between the information processing apparatus and the cloud server;

in response to receiving a user instruction for connecting the information processing apparatus to the cloud server, acquire the connection destination information and the network setting information lists one by one in a descending order of probability of successfully establishing the network connection from the memory, and repeat operations of connecting the information processing apparatus to the cloud server using the acquired connection destination information and the acquired network setting information lists until the network connection is established with the cloud server, including acquiring a first network setting information list having a highest probability of successfully establishing the network connection from the memory, generating one or more first communication packets, and sending the one or more first communication packets to at least one of the plurality of servers as the connection destination via the network, using the acquired connection destination information and the acquired first network setting information list, and in response to receiving a failure notification or no reply from the at least one of the plurality of servers, acquiring a second network setting information list having a second highest probability of successfully establishing the network connection from the memory, and generating one or more second communication packets, and sending the one or more second communication packets to the at least one of the plurality of servers as the connection destination via the network, using the acquired connection destination information and the acquired second network setting information list; and control a display device to notify a user of a progress status of the operations of connecting the information processing apparatus to the cloud server.

16. The non-transitory computer-readable medium of claim 15, wherein the plurality of network setting information lists each include a plurality of layers, one or more parameters to be set for each layer, and a setting value for each parameter, and at least a subset of network setting information is different in each of the plurality of network setting information lists.

17. The non-transitory computer-readable medium of claim 15, the computer-executable program when executed by the processor causing the information processing apparatus to, in response to receiving a success notification from the at least one of the plurality of servers, store whichever one of the acquired network setting information lists, based on which the network connection with the cloud server was successfully established, in a storage device, and use the network setting information list stored in the storage device each time the information processing apparatus accesses the cloud service provided by the plurality of servers.

* * * * *